(12) United States Patent
Martin et al.

(10) Patent No.: US 9,016,068 B2
(45) Date of Patent: Apr. 28, 2015

(54) MID-TURBINE FRAME WITH OIL SYSTEM MOUNTS

(75) Inventors: Octavio Martin, Manchester, CT (US); Jorge I. Farah, Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 392 days.

(21) Appl. No.: 13/548,569

(22) Filed: Jul. 13, 2012

(65) Prior Publication Data

US 2014/0013769 A1 Jan. 16, 2014

(51) Int. Cl.
*F02C 7/20* (2006.01)
*F02C 6/00* (2006.01)
*F02C 7/06* (2006.01)
*F02G 3/00* (2006.01)
*B64D 41/00* (2006.01)
*F01D 25/28* (2006.01)
*F01D 25/18* (2006.01)
*F02C 7/32* (2006.01)

(52) U.S. Cl.
CPC . *F02C 7/20* (2013.01); *F01D 25/28* (2013.01); *F01D 25/18* (2013.01); *F02C 7/32* (2013.01)

(58) Field of Classification Search
CPC .................................. F01D 25/28; F02C 7/32
USPC .............................. 60/796, 39.08, 802; 244/58
See application file for complete search history.

(56) References Cited

U.S. PATENT DOCUMENTS

| 2,978,869 | A |  | 4/1961 | Hiscock et al. |
| 3,543,588 | A | * | 12/1970 | Richardson ..................... 74/15.8 |
| 4,170,873 | A | * | 10/1979 | Milo ............................. 60/39.08 |
| 4,979,872 | A |  | 12/1990 | Myers et al. |
| 5,452,575 | A |  | 9/1995 | Freid |
| 6,170,252 | B1 | * | 1/2001 | Van Duyn ........................ 60/796 |
| 6,212,974 | B1 |  | 4/2001 | Van Duyn |
| 6,260,351 | B1 |  | 7/2001 | Delano et al. |
| 6,357,220 | B1 |  | 3/2002 | Snyder et al. |
| 6,735,954 | B2 |  | 5/2004 | MacFarlane et al. |
| 7,055,330 | B2 |  | 6/2006 | Miller |
| 7,500,365 | B2 |  | 3/2009 | Suciu et al. |
| 7,532,969 | B2 |  | 5/2009 | Bruno et al. |
| 2007/0125087 | A1 | * | 6/2007 | Callaghan ........................ 60/772 |
| 2009/0317229 | A1 |  | 12/2009 | Suciu et al. |
| 2010/0275572 | A1 | * | 11/2010 | Durocher et al. ............. 60/39.08 |
| 2011/0030386 | A1 |  | 2/2011 | Kumar et al. |

(Continued)

FOREIGN PATENT DOCUMENTS

| EP | 1908929 | A2 | 4/2008 |
| EP | 2133514 | A2 | 12/2009 |
| EP | 2372129 | A2 | 10/2011 |

OTHER PUBLICATIONS

International Search Report and Written Opinion from PCT Application Serial No. PCT/US2013/050263, dated Oct. 16, 2013, 10 pages.

*Primary Examiner* — Ehud Gartenberg
*Assistant Examiner* — Rene Ford
(74) *Attorney, Agent, or Firm* — Kinney & Lange, P.A.

(57) ABSTRACT

A gas turbine engine includes a combustor, a first turbine section in fluid communication with the combustor, a second turbine section in fluid communication with the first turbine section, and a mid-turbine frame located axially between the first turbine section and the second turbine section. An oil system includes a first oil system component that houses oil. A first connector mechanically connects the first oil system component to the mid-turbine frame.

20 Claims, 6 Drawing Sheets

(56) References Cited

U.S. PATENT DOCUMENTS

| | | |
|---|---|---|
| 2011/0030387 A1 | 2/2011 | Kumar et al. |
| 2011/0079019 A1 | 4/2011 | Durocher et al. |
| 2011/0239660 A1 | 10/2011 | Suciu et al. |
| 2012/0087780 A1 | 4/2012 | Suciu et al. |

* cited by examiner

MID-TURBINE FRAME WITH OIL SYSTEM MOUNTS

BACKGROUND

The present disclosure relates generally to a gas turbine engine, and in particular to a mid-turbine frame (MTF) included in a gas turbine engine.

A mid-turbine frame (MTF) is positioned between a high pressure turbine stage and a low pressure turbine stage of a gas turbine engine. The MTF supports one or more bearings and transfers bearing loads from an inner portion of the gas turbine engine to an outer engine frame. The MTF also serves to route air from the high pressure turbine stage to the low pressure turbine stage.

SUMMARY

A gas turbine engine includes a combustor, a first turbine section in fluid communication with the combustor, a second turbine section in fluid communication with the first turbine section, and a mid-turbine frame located axially between the first turbine section and the second turbine section. An oil system includes a first oil system component that houses oil. A first connector mechanically connects the first oil system component to the mid-turbine frame.

Another embodiment is a gas turbine engine including a combustor, a first turbine section in fluid communication with the combustor, a second turbine section in fluid communication with the first turbine section, and a mid-turbine frame located axially between the first turbine section and the second turbine section. An oil reservoir is mechanically connected to the mid-turbine frame by a first connector. An accessory gearbox is mechanically connected to the mid turbine frame by a second connector.

Another embodiment is a method of attaching an oil system component to a gas turbine engine having a mid-turbine frame axially aft of a high-pressure turbine and fore of a low-pressure turbine. The method includes positioning the oil system component radially outward of a case of the gas turbine engine, attaching a first bracket to a rear side of the oil system component, attaching a second bracket to a boss of the mid-turbine frame, and connecting the first bracket to the second bracket.

DETAILED DESCRIPTION

Figure 1:
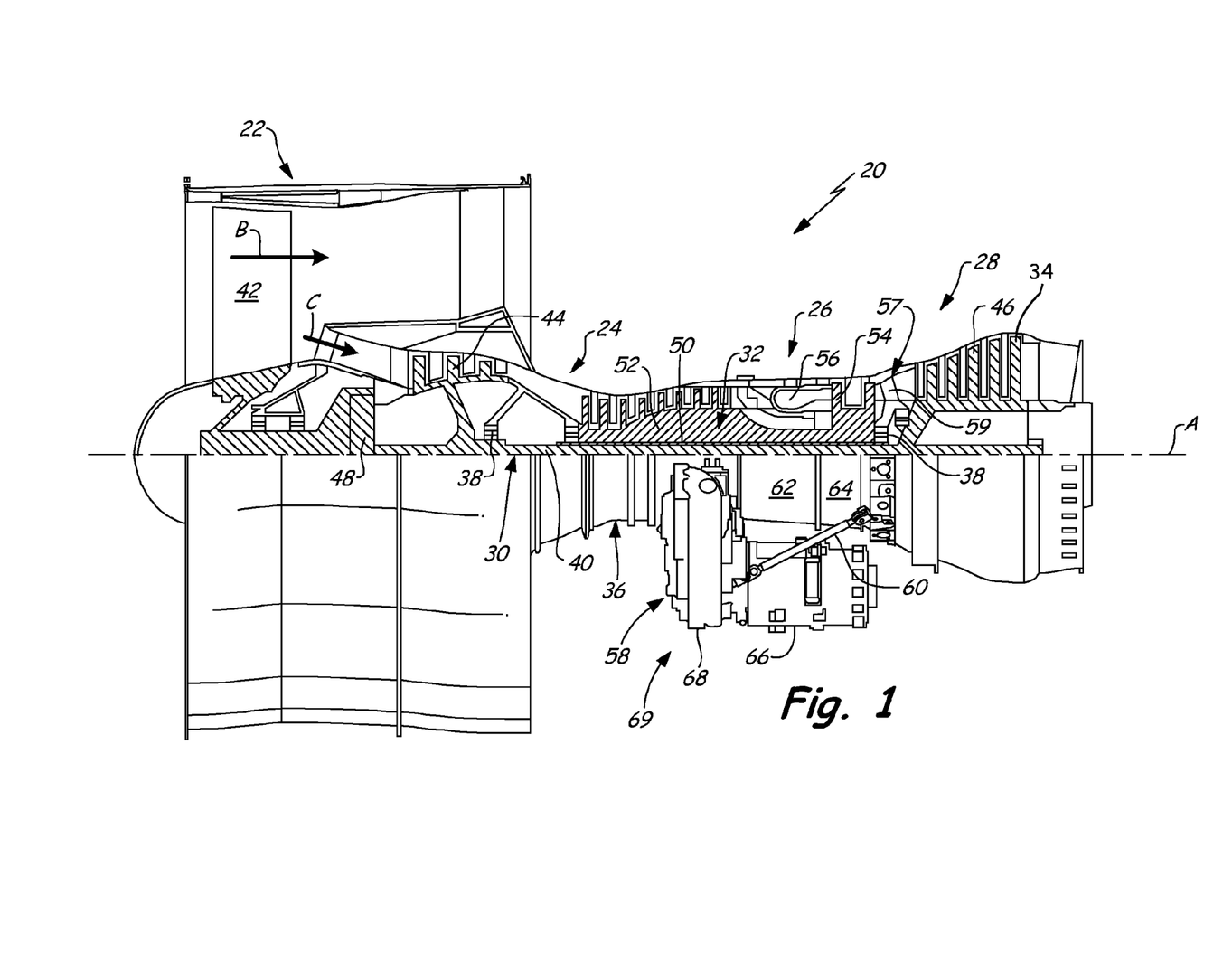
FIG. 1 is a schematic view of a gas turbine engine with an accessory gearbox mounted to a mid-turbine frame (MTF).

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 57 of engine static structure 36 is arranged generally between high pressure turbine 54 and low pressure turbine 46. Mid-turbine frame 57 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 57 includes vanes 59, which are in the core airflow path and function as an inlet guide vane for low pressure turbine 46. Utilizing vane 59 of mid-turbine frame 57 as the inlet guide vane for low pressure turbine 46 decreases the length of low pressure turbine 46 without increasing the axial length of mid-turbine frame 57. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram }°R)/518.7)^{0.5}]$. The "Low corrected fan tip speed", as disclosed herein according to one non-limiting embodiment, is less than about 1150 ft/second.

The example gas turbine engine includes fan 42 that comprises in one non-limiting embodiment less than about 26 fan blades. In another non-limiting embodiment, fan section 22 includes less than about 20 fan blades. Moreover, in one disclosed embodiment low pressure turbine 46 includes no more than about 6 turbine rotors schematically indicated at 34. In another non-limiting example embodiment low pressure turbine 46 includes about 3 turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Accessory gearbox 58 is mechanically connected to MTF 57 via connector 60. By mounting accessory gearbox 58 to MTF 57 via connector 60, MTF 57 can provide structural support for accessory gearbox in an axially rearward direction. This can help distribute loads from accessory gearbox 58 and reduce damage caused by undesirable vibration. Accessory gearbox 58 is also connected to diffuser case 62 in a manner described with respect to FIG. 2. Diffuser case 62 is spaced from MTF 57 via high pressure turbine case 64. In the illustrated embodiment, accessory gearbox 58 is connected to and driven by high speed spool 32. In alternative embodiments, accessory gearbox 58 can be connected to and driven by low speed spool 30.

Electrical generator 66 is mounted to and driven by accessory gearbox 58. Electrical generator 66 is one of multiple engine accessories (such as oil pumps, fuel pumps, deoilers, etc.) (not shown) that can be connected to and driven by accessory gearbox 58. Accessory gearbox 58 includes various gears and bearings (not shown) that connect electrical generator 66 and other engine accessories to high speed spool 32 so as to rotate with high speed spool 32. These gears and bearings in accessory gearbox 58 receive lubricating oil supplied from and scavenged by the oil pumps. The lubricating oil collects in accessory gearbox 58 at sump 68 at a bottom of accessory gearbox 58. Thus, accessory gearbox 58 houses oil in addition to gears and bearings. Accessory gearbox 58 is one component of oil system 69, which can include an oil reservoir (shown in FIGS. 4 and 5), oil tubes (shown in FIG. 6) delivering fluid to and from bearings 38 and other components, and/or various pumps, valves, filters and other oil system components (not shown).

Figure 2:
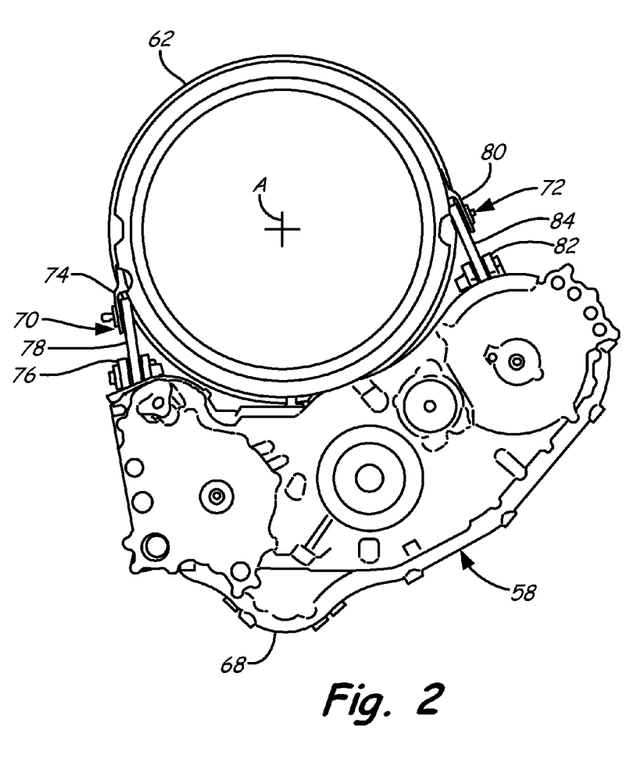
FIG. 2 is an axial view of the accessory gearbox mounted to a diffuser case.

FIG. 2 is an axial view of accessory gearbox 58 mounted to diffuser case 62. Accessory gearbox 58 is mounted to diffuser case via connectors 70 and 72. Connector 70 includes bracket 74 mounted to a side of diffuser case 62, bracket 76 mounted to a top of accessory gearbox 58, and link 78 connecting bracket 74 to bracket 76. Connector 72 includes bracket 80 mounted to a side of diffuser case 62 opposite bracket 74, bracket 82 mounted to a top of accessory gearbox 58, and link 84 connecting bracket 80 to bracket 82. Connectors 70 and 72 structurally support accessory gearbox 58 by transmitting loads from accessory gearbox 58 to diffuser case 62 through connectors 70 and 72. Accessory gearbox 58 is mounted proximate and radially outward of diffuser case 62.

Figure 3:
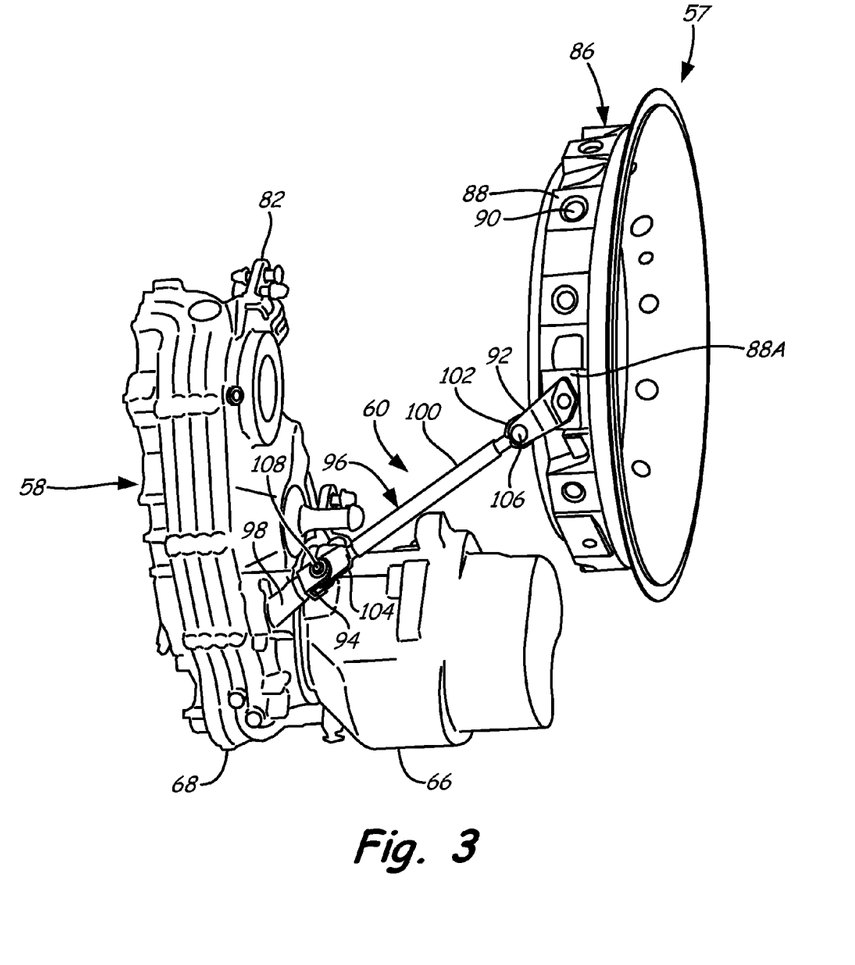
FIG. 3 is a perspective view of the accessory gearbox mounted to the MTF.

FIG. 3 is a perspective view of accessory gearbox 58 mounted to outer case 86 of MTF 57. Outer case 86 includes a plurality of bosses 88 and holes 90 extending through bosses 88. Flow tubes (not shown in FIG. 3) such as cooling air passages and oil tubes can be connected to bosses 88 to flow cooling air and oil through holes 90 into MTF 57 to cool and lubricate components radially inward of outer case 86. For example, oil can flow through one or more of holes 90 to be passed to bearings 38 (shown in FIG. 1) to cool and lubricate bearings 38.

Accessory gearbox 58 is mounted to MTF 57 via connector 60. Connector 60 includes bracket 92 mounted to outer case 86 of MTF 57, bracket 94 mounted to an axially rear side of accessory gearbox 58, and link 96 connecting bracket 92 to bracket 94. Bracket 92 is connected to boss 88A of MTF 57 via an interference fit. Bracket 94 is connected to tongue 98, which extends axially rearward from accessory gearbox 58 at a slight angle. Link 96 includes shaft 100 with tangs 102 and 104 at each end. Tangs 102 and 104 connect to brackets 92 and 94 via pins 106 and 108, respectively. In the illustrated embodiment, link 96 is a tie rod for transmitting loads in compression and tension between accessory gearbox 58 and MTF 57. Connector 60 extends substantially axially rearward from accessory gearbox 58 to transmit substantially axial loads from accessory gearbox 58 to MTF 57. In the embodiment shown in FIGS. 1 and 3, connector 60 is slightly angled with respect to central longitudinal axis A (shown in FIG. 1).

Figure 4:
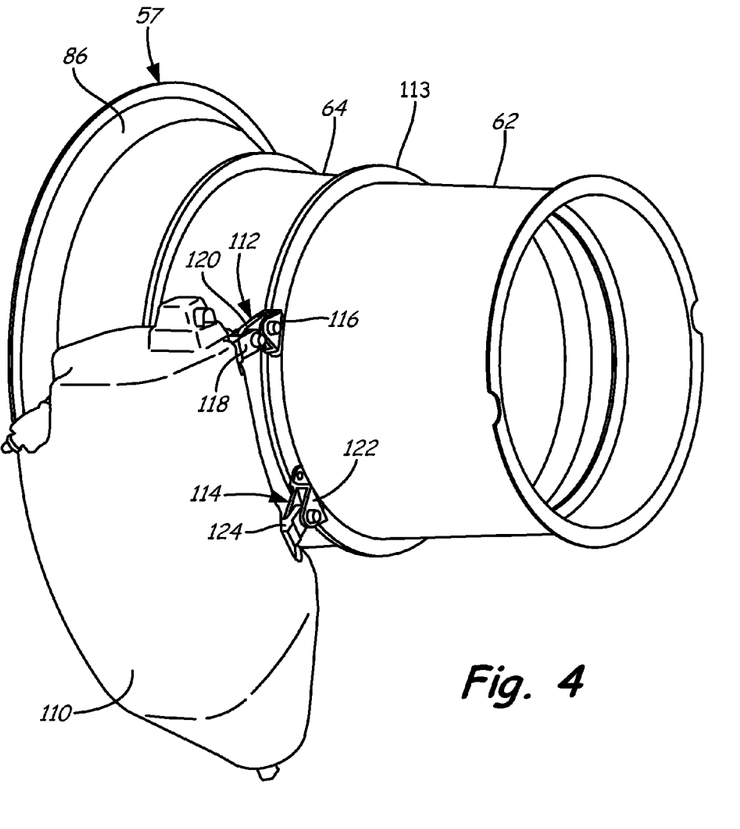
FIG. 4 is a perspective view of an oil reservoir mounted to the diffuser case.

FIG. 4 is a perspective view of oil reservoir 110 mounted to diffuser case 62. Diffuser case 62 is connected to high pressure turbine case 64, which is connected to outer case 86 of MTF 57. Diffuser case 62 is connected to high pressure turbine case 64 via diffuser case flange 113. In the illustrated embodiment, oil reservoir 110 is a main oil reservoir for oil system 69 (shown in FIG. 1). Oil reservoir 110 is mounted to diffuser case 62 via connectors 112 and 114. Connector 112 includes bracket 116 mounted to diffuser case flange 113, bracket 118 mounted to oil reservoir 110, and link 120 connecting bracket 116 to bracket 118. Connector 114 includes bracket 122 mounted to diffuser case flange 113 below bracket 116, and bracket 124 mounted to oil reservoir 110 below bracket 118. Bracket 124 is connected to bracket 122. Connectors 112 and 114 structurally support oil reservoir 110 by transmitting loads from oil reservoir 110 to diffuser case 62 through connectors 112 and 114. Oil reservoir 110 is mounted proximate and radially outward of high pressure turbine case 64. In an alternative embodiment, connectors 112 and 114 could connect oil reservoir 110 to high pressure turbine case 64.

Figure 5:
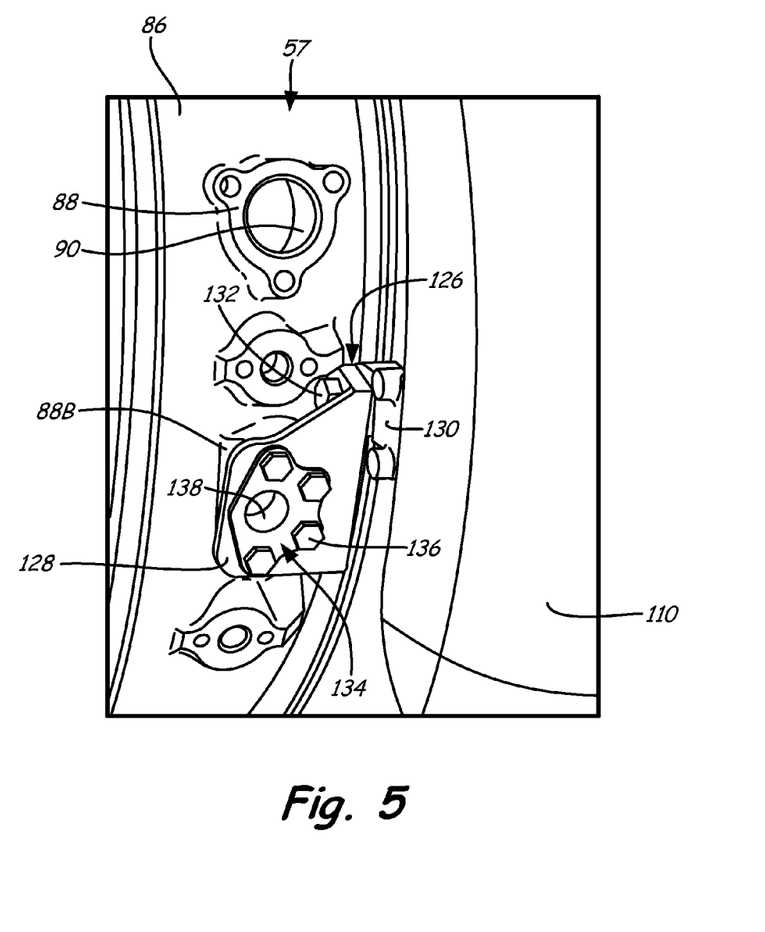
FIG. 5 is a partial perspective view of the oil reservoir mounted to the MTF.

FIG. 5 is a partial perspective view of oil reservoir 110 mounted to MTF 57, showing outer case 86 of MTF 57 with bosses 88 and holes 90. FIG. 5 shows a side of outer case 86 opposite that shown in FIG. 3. Oil reservoir 110 is mounted to MTF 57 via connector 126. Connector 126 includes bracket 128 mounted to boss 88B of outer case 86 and bracket 130 mounted to an axially rear side of oil reservoir 110. Bracket 128 is connected to bracket 130 via fastener 132. In the illustrated embodiment, fastener 132 is a bolt. Oil pipe bracket 134 is attached to bracket 128 via fasteners 136. In the illustrated embodiment, fasteners 136 are bolts that attach both bracket 128 and oil tube bracket 134 to boss 88B. Oil tube bracket 134 includes hole 138 extending through oil tube bracket 134 to allow an oil tube (shown in FIG. 6) to extend through oil tube bracket 134, bracket 128, and outer case 86 into a radially inward portion of MTF 57. Connector 126 extends substantially axially rearward from oil reservoir 110 to transmit axial, radial, and circumferential loads from oil reservoir 110 to MTF 57.

Figure 6:
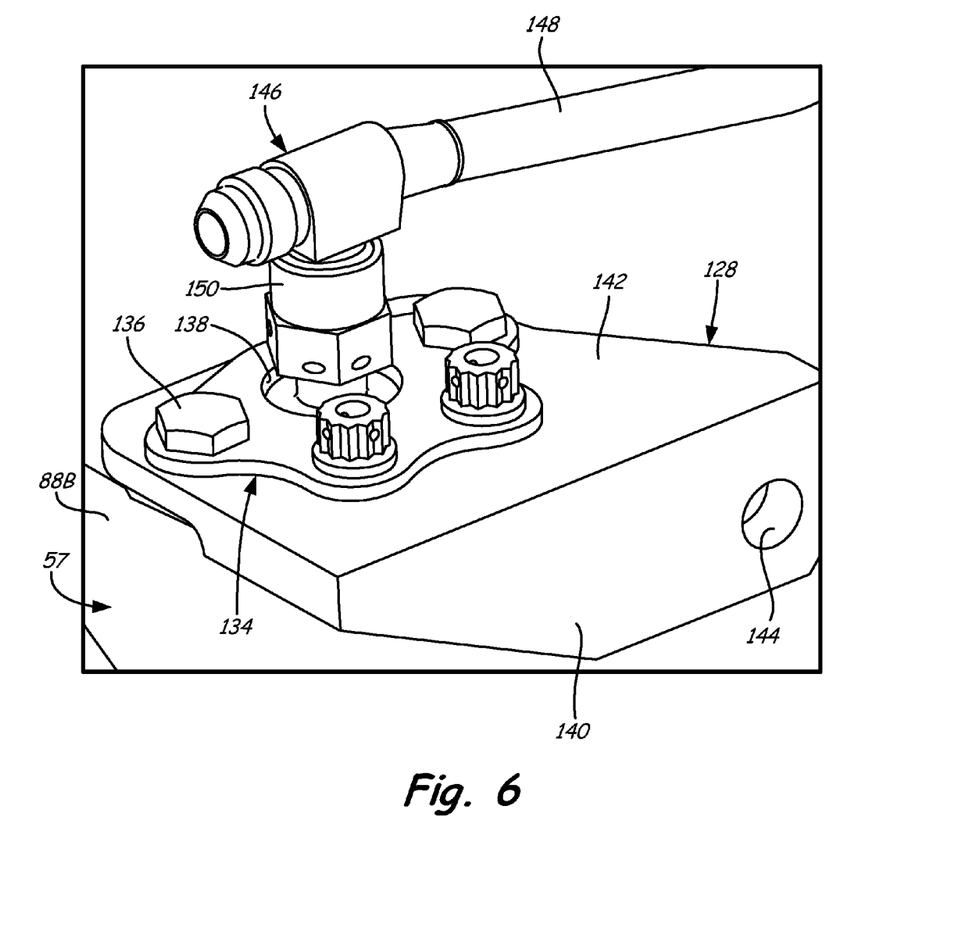
FIG. 6 is a partial perspective view of a bracket used to mount the oil reservoir to the MTF.

FIG. 6 is a partial perspective view of bracket 128 and oil tube bracket 134. Bracket 128 includes two substantially perpendicular and integrally formed plates 140 and 142. Plate 140 includes hole 144 through which fastener 132 (shown in FIG. 5) extends. Plate 142 provides the surface upon which oil tube bracket 134 mounts. Oil tube 146 extends through hole 138 in oil tube bracket 134 and through a hole (not shown) in bracket 128 into MTF 57. Oil tube 146 includes pipe 148 and pipe connector 150. Though oil tube 146 is illustrated with respect to bracket 128 in FIG. 6, a similar oil tube can extend through bracket 92 in FIG. 3.

As described above, connectors 60, 70, 72, 112, 114, and 126 provide connections to mount accessory gearbox 58 and oil reservoir 110 to gas turbine engine 20. Connectors 60 and 126 mechanically connect accessory gearbox 58 and oil reservoir 110 to MTF 57, which provides structural support in an axially rearward direction. Structurally supporting these relatively large oil system components in an axially rearward direction via MTF 57 can help distribute loads from such components and reduce damage caused by undesirable vibration. By mounting brackets 92 and 128 at bosses 88A and 88B, which are the same bosses used to mount oil tubes, the number of bosses required on outer frame 86 of MTF 57 can be reduced. This can reduce the overall cost and weight of MTF 57. Additionally, connecting connectors 60, 70, 72, 112, 114, and 126 as described can facilitate relative optimal assembly of gas turbine engine 20.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, connectors 60, 70, 72, 112, 114, and 126 can be sized and shaped as appropriate for a particular application. Additionally, MTF 57 can be used in a gas turbine engine different than gas turbine engine 20, and can be modified as appropriate for that engine.

The invention claimed is:

1. A gas turbine engine comprising:
a combustor;
a first turbine section in fluid communication with the combustor;
a second turbine section in fluid communication with the first turbine section;
a mid-turbine frame located axially between the first turbine section and the second turbine section;
an oil system comprising a first oil system component that houses oil; and
a first connector mechanically connecting the first oil system component to the mid-turbine frame.

2. The gas turbine engine of claim 1, wherein the first oil system component comprises one of an accessory gearbox and an oil reservoir.

3. The gas turbine engine of claim 2, and further comprising:
a second connector connecting the first oil system component to a diffuser case; and
a third connector mechanically connecting the first oil system component to the diffuser case.

4. The gas turbine engine of claim 3, wherein the second connector comprises a first bracket on the oil system component, a second bracket on the diffuser case, and a link connecting the first bracket to the second bracket.

5. The gas turbine engine of claim 1, wherein the first connector comprises a first bracket on the oil system component, a second bracket on the mid turbine frame, and a link connecting the first bracket to the second bracket.

6. The gas turbine engine of claim 1, wherein the first connector comprises a bracket mounted on a boss of the outer case of the mid turbine frame.

7. The gas turbine engine of claim 6, and further comprising:
an oil tube extending into the mid-turbine frame through a hole in the bracket.

8. The gas turbine engine of claim 6, wherein the bracket is connected to the boss via an interference fit.

9. The gas turbine engine of claim 1, wherein the oil system component is mounted proximate and radially outward of a case of the first turbine.

10. The gas turbine engine of claim 1, wherein the first oil system component is an accessory gearbox, and further comprising:
an oil reservoir; and
a second connector mechanically connecting the oil reservoir to the mid-turbine frame.

11. The gas turbine engine of claim 10, and further comprising:
oil tubes extending through brackets of each of the first and second connectors.

12. The gas turbine engine of claim 1, wherein the first connector extends axially rearward from the oil system component.

13. A gas turbine engine comprising:
a combustor;
a first turbine section in fluid communication with the combustor;
a second turbine section in fluid communication with the first turbine section;
a mid-turbine frame located axially between the first turbine section and the second turbine section;
an oil reservoir mechanically connected to the mid-turbine frame by a first connector; and
an accessory gearbox mechanically connected to the mid turbine frame by a second connector.

14. The mid-turbine frame of claim 13, wherein the first connector comprises a first bracket mounted on a first boss of the mid-turbine frame and wherein the second connector comprises a second bracket mounted on a second boss of the mid-turbine frame.

15. The mid turbine frame of claim 14, and further comprising:
oil tubes extending through each of the first and second brackets.

16. The gas turbine engine of claim 13, wherein the first connector extends axially rearward from the oil reservoir to the mid turbine frame, and wherein the second connector extends axially rearward from the accessory gearbox to the mid turbine frame.

17. A method of attaching an oil system component to a gas turbine engine having a mid-turbine frame axially aft of a first turbine and fore of a second turbine, the method comprising:
positioning the oil system component radially outward of a case of the gas turbine engine;
attaching a first bracket to a rear side of the oil system component;
attaching a second bracket to a boss of the mid-turbine frame; and
connecting the first bracket to the second bracket.

18. The method of claim 17, wherein the second bracket is attached to the boss of the mid turbine frame prior to connecting the first bracket to the second bracket.

19. The method of claim 17, and further comprising:
extending an oil tube through the second bracket and the boss into the mid-turbine frame.

20. The method of claim 17, wherein the oil system component is an accessory gearbox, and further comprising:
positioning an oil reservoir radially outward of the case;
attaching a third bracket to a rear side of the oil reservoir;
attaching a fourth bracket to a second boss of the mid-turbine frame; and
connecting the third bracket to the fourth bracket.

* * * * *